(12) United States Patent
Moser et al.

(10) Patent No.: US 9,359,065 B2
(45) Date of Patent: Jun. 7, 2016

(54) SYSTEM AND METHOD FOR OPTIMIZING PERFORMANCE OF AN AIRCRAFT

(71) Applicant: The Boeing Company, Chicago, IL (US)

(72) Inventors: Matthew A. Moser, Marysville, WA (US); Michael R. Finn, Kirkland, WA (US); Mark J. Gardner, Snohomish, WA (US); Robert M. Murphy, Everett, WA (US); Adam Thoreen, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 14/034,920

(22) Filed: Sep. 24, 2013

(65) Prior Publication Data

US 2015/0083850 A1    Mar. 26, 2015

(51) Int. Cl.
| B64C 3/38 | (2006.01) |
| B64C 13/16 | (2006.01) |
| B64C 9/16 | (2006.01) |
| B64C 13/04 | (2006.01) |

(52) U.S. Cl.
CPC . *B64C 13/16* (2013.01); *B64C 9/16* (2013.01); *B64C 13/04* (2013.01); *Y02T 50/32* (2013.01); *Y02T 50/44* (2013.01)

(58) Field of Classification Search
CPC ............ B64C 3/50; B64C 3/48; B64C 9/323; B64C 9/02; B64C 13/16; B64C 2009/143; B64C 7/00; B64C 9/32; B64C 13/503; B64C 1/26; B64C 2039/105; Y02T 50/44; Y02T 50/145; Y02T 50/12; Y02T 50/672; Y02T 50/166; Y02T 50/64; Y02T 50/673; Y02T 50/164; Y02T 50/34
USPC ............... 244/99.2, 99.3, 214, 213, 215, 183, 244/226, 229; 701/3, 1, 14, 36, 11, 16, 15
See application file for complete search history.

(56) References Cited

U.S. PATENT DOCUMENTS

| 2,350,751 | A | 6/1944 | Carlo et al. |
| 3,586,267 | A * | 6/1971 | Ingelman-Sundberg ..... 244/203 |
| 3,822,047 | A | 7/1974 | Schuldt, Jr. |
| 4,106,730 | A | 8/1978 | Spitzer et al. |
| 4,725,026 | A | 2/1988 | Krafka et al. |

(Continued)

FOREIGN PATENT DOCUMENTS

| EP | 0193442 A1 | 9/1986 |
| EP | 1547917 A1 | 6/2005 |

(Continued)

OTHER PUBLICATIONS

"Futaba Skysport 6A Instructional Manual", Futana Corporation Mar. 2, 2013.*

(Continued)

*Primary Examiner* — Brian M O'Hara
*Assistant Examiner* — Assres H Woldemaryam (57) ABSTRACT

A system for optimizing performance of an aircraft may include a flight control computer for computing an optimum flap setting based on aircraft data. The system may further include a flap control system having a flap control device. The system may additionally include a flap actuation system coupled to the flap control system for positioning the trailing edge device at the optimum flap setting.

20 Claims, 7 Drawing Sheets

(56) References Cited

U.S. PATENT DOCUMENTS

| | | | |
|---|---|---|---|
| 4,729,528 | A | 3/1988 | Borzachillo |
| 4,821,981 | A | 4/1989 | Gangsaas et al. |
| 4,838,503 | A | 6/1989 | Williams |
| 5,839,699 | A | 11/1998 | Bliesner |
| 6,152,405 | A | 11/2000 | Muller |
| 6,913,228 | B2 | 7/2005 | Lee |
| 7,243,881 | B2 * | 7/2007 | Sakurai et al. ............... 244/212 |
| 7,366,592 | B2 * | 4/2008 | Delaplace et al. ............... 701/4 |
| 7,494,094 | B2 * | 2/2009 | Good et al. ................... 244/215 |
| 7,556,224 | B2 | 7/2009 | Johnson |
| 7,635,107 | B2 * | 12/2009 | Shmilovich et al. .......... 244/207 |
| 7,641,152 | B2 * | 1/2010 | Onu .......................... B64C 9/12 |
| | | | 244/194 |
| 7,726,610 | B2 | 6/2010 | Good et al. |
| 8,256,718 | B2 * | 9/2012 | Fleddermann et al. ....... 244/194 |
| 8,356,766 | B2 | 1/2013 | Garthaffner |
| 8,424,810 | B1 | 4/2013 | Shmilovich et al. |
| 8,757,538 | B2 * | 6/2014 | Seifert ........................... 244/46 |
| 8,814,085 | B2 * | 8/2014 | Richter et al. ............... 244/99.4 |
| 8,880,247 | B2 * | 11/2014 | Luckner et al. ................ 701/18 |
| 8,954,208 | B2 | 2/2015 | Yamasaki |
| 2004/0128038 | A1 * | 7/2004 | Richter .................. B64C 13/04 |
| | | | 701/3 |
| 2005/0011994 | A1 | 1/2005 | Sakurai et al. |
| 2006/0049308 | A1 | 3/2006 | Good et al. |
| 2007/0124034 | A1 * | 5/2007 | Pitard .................. G05D 1/0083 |
| | | | 701/15 |
| 2010/0194599 | A1 * | 8/2010 | Ishihara ................ B64D 43/02 |
| | | | 340/969 |
| 2010/0200704 | A1 * | 8/2010 | Berens ..................... B64C 9/16 |
| | | | 244/76 A |
| 2011/0127385 | A1 | 6/2011 | Morris |
| 2012/0032030 | A1 * | 2/2012 | Ruckes et al. ................ 244/215 |
| 2012/0153085 | A1 * | 6/2012 | Good et al. ................... 244/215 |

FOREIGN PATENT DOCUMENTS

| | | |
|---|---|---|
| FR | 2902756 | 12/2007 |
| GB | 2186849 | 8/1987 |
| WO | WO9915403 | 4/1999 |

OTHER PUBLICATIONS

"Internet Archive WayBack Machine Public Availability Date".*
European Search Report for EP1418 5968.6, dated Feb. 10, 2015.
Airbus, "Getting to Grips with Aircraft Performance," Jan. 2002.
Delta Virtual Airlines, "Boeing 777-200ER Aircraft Operating Manual," Nov. 2005.
The Boeing Company, "777 Flight Crew Operations Manual," Dec. 15, 2003.

* cited by examiner

SYSTEM AND METHOD FOR OPTIMIZING PERFORMANCE OF AN AIRCRAFT

FIELD

The present disclosure relates generally to aircraft control surfaces and, more particularly, to optimizing a position of the trailing edge devices of an aircraft.

BACKGROUND

Aircraft, such as commercial airliners, typically include control surfaces or devices mounted on the wings to improve the aerodynamic performance of the aircraft. Such control surfaces include wing leading edge devices and wing trailing edge devices which may be extended and/or deflected during different phases of a flight, to alter the lift and/or drag characteristics of the wings. For example, commercial airliners typically include trailing edge flaps which may be extended during takeoff to increase the camber of the wings, resulting in an increase in the lift characteristics of the wings during takeoff and climb-out of the aircraft.

Conventional aircraft typically allow for extending the flaps to a limited number of flap settings for a given flight phase. Such flap settings may be based on the aircraft configuration and a given set of airport parameters and/or atmospheric conditions. For example, during takeoff, conventional aircraft may allow for extending the flaps to a takeoff flap setting of Flaps 15. Such a takeoff flap setting may be based on a maximum takeoff weight aircraft with engines operating at maximum takeoff thrust and departing from a standard length runway at sea level.

However, the aircraft may have an actual takeoff weight that may be less than the maximum takeoff weight such that the Flaps 15 setting may result in operating the engines at an unnecessarily high thrust setting which may contribute to engine wear and generate excessive engine noise. In addition, positioning the flaps at a flap setting of Flaps 15 may generate a climb rate that is above or below what may be required for obstacle or engine-out climb requirements. In contrast, operating the engines at an optimum (e.g., reduced) thrust setting may allow for a reduction in engine sizing and reduced mission fuel burn corresponding to reduced fuel requirements which may translate into improved aircraft performance in the form of increased takeoff weight capability.

As can be seen, there exists a need in the art for a system and method for optimizing the flap setting and thrust setting for a given aircraft configuration and a given set of airport parameters and/or atmospheric conditions.

SUMMARY

The above-noted needs associated with flap settings ant thrust settings are specifically addressed and alleviated by the present disclosure which provides a system for optimizing performance of an aircraft. The system may include a flight control computer configured to compute an optimum flap setting based on aircraft data. The system may further include a flap control system having a flap control device, and a flap actuation system coupled to the flap control system for positioning a trailing edge device at the optimum flap setting.

In a further embodiment, disclosed is an aircraft having a wing. The wing may include a trailing edge device mounted to a trailing edge. The aircraft may also include a system for optimizing a flap setting of the flap. The system may include a processor-based flight control computer configured to compute an optimum flap setting based on aircraft data. The system may further include a flap control system having a flap control device and a variable-trailing-edge-position switch for selecting a desired flap setting corresponding to the optimum flap setting. The variable-trailing-edge-position switch may be operative when the flap control device is in a control device position. The system may additionally include a flap actuation system coupled to the flap control system for positioning the trailing edge device at the desired flap setting.

Also disclosed is a method of optimizing performance of an aircraft. The method may include determining an optimum flap setting based on aircraft data. The method may additionally include selecting a desired flap setting corresponding to the optimum flap setting. The method may further include positioning a trailing edge device at the desired flap setting.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
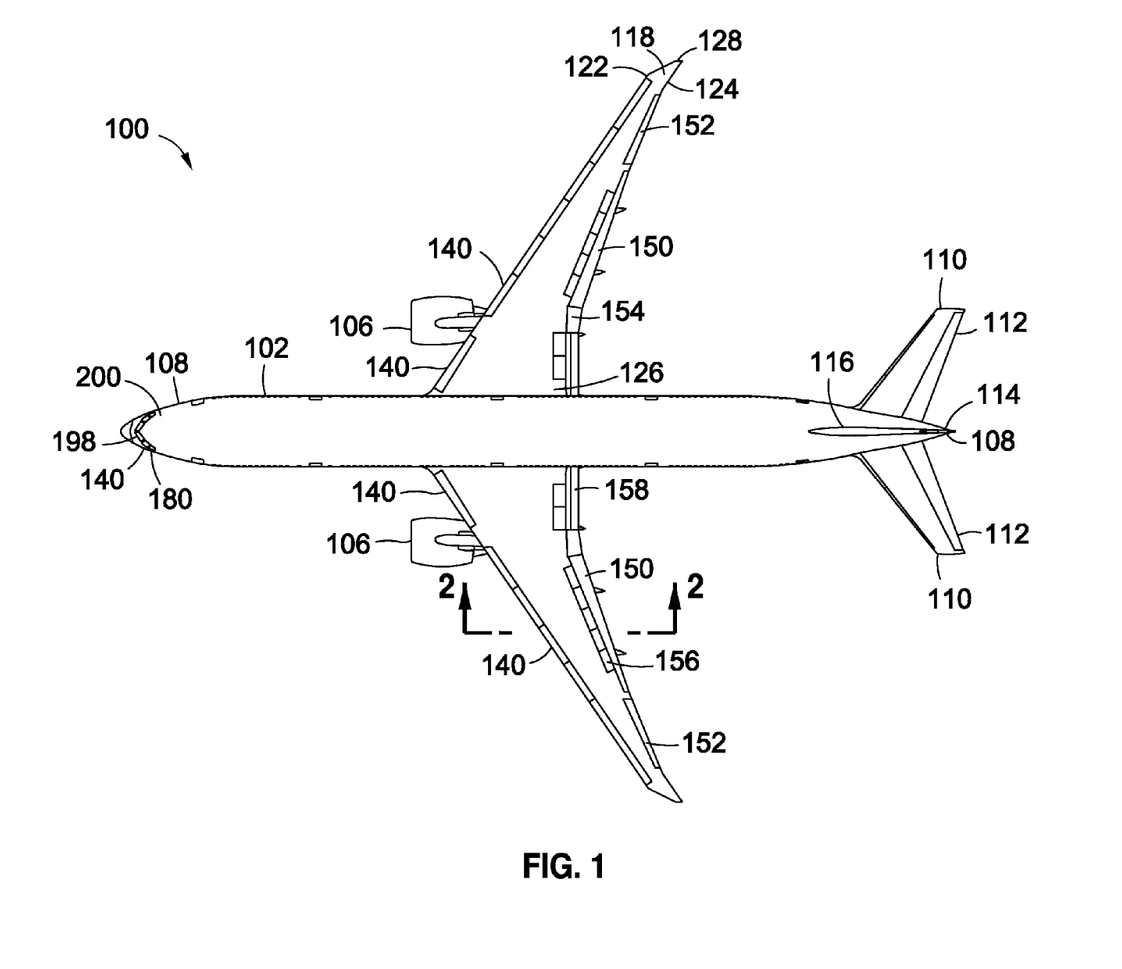
FIG. 1 is a is a top view of an aircraft.

Referring now to the drawings wherein the showings are for purposes of illustrating various embodiments of the present disclosure, shown in FIG. 1 is a perspective view of an aircraft 100. The aircraft 100 may include a fuselage 102 having a pair of wings 118 attached to the fuselage 102 at a wing root 126 and extending outwardly toward a wing tip 128. One or more propulsion units 106 may be mounted on the wings 118. The aircraft 100 may include an empennage 108 having a horizontal tail 110 and elevator 112, and a vertical tail 114 and rudder 116 for directional control of the aircraft 100. The aircraft 100 may include one or more leading edge devices 140 mounted on the leading edge 122 of the wings 118, and one or more trailing edge devices 150 mounted on the trailing edge 124 of the wings 118.

In FIG. 1, the leading edge devices 140 and trailing edge devices 150 may be moved from a retracted position 146, 166 (FIG. 2) to one or more deployed positions 148, 168 (FIG. 3) to improve the lift characteristics and/or drag characteristics of the wings 118. The aircraft 100 advantageously includes a flap optimizing system 180 for optimizing the position of one or more trailing edge devices 150 as a function of aircraft data 400 (FIG. 4) as described below. Although the flap optimizing system 180 is described in the context of a tube-and-wing aircraft 100 shown in FIG. 1, the flap optimizing system 180 may be incorporated into any aircraft embodiment, without limitation, including blended wing aircraft, hybrid wing-body aircraft, and other aircraft embodiments.

Figure 2:
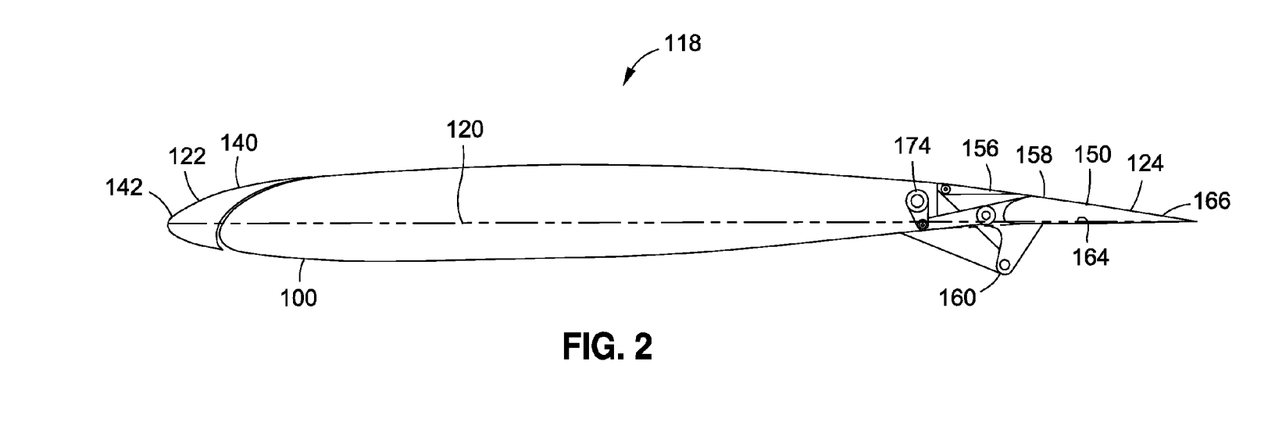
FIG. 2 is a cross-sectional view of a wing taken along line 2 of FIG. 1 and showing a leading edge device and a trailing edge device in a refracted position.
Figure 3:
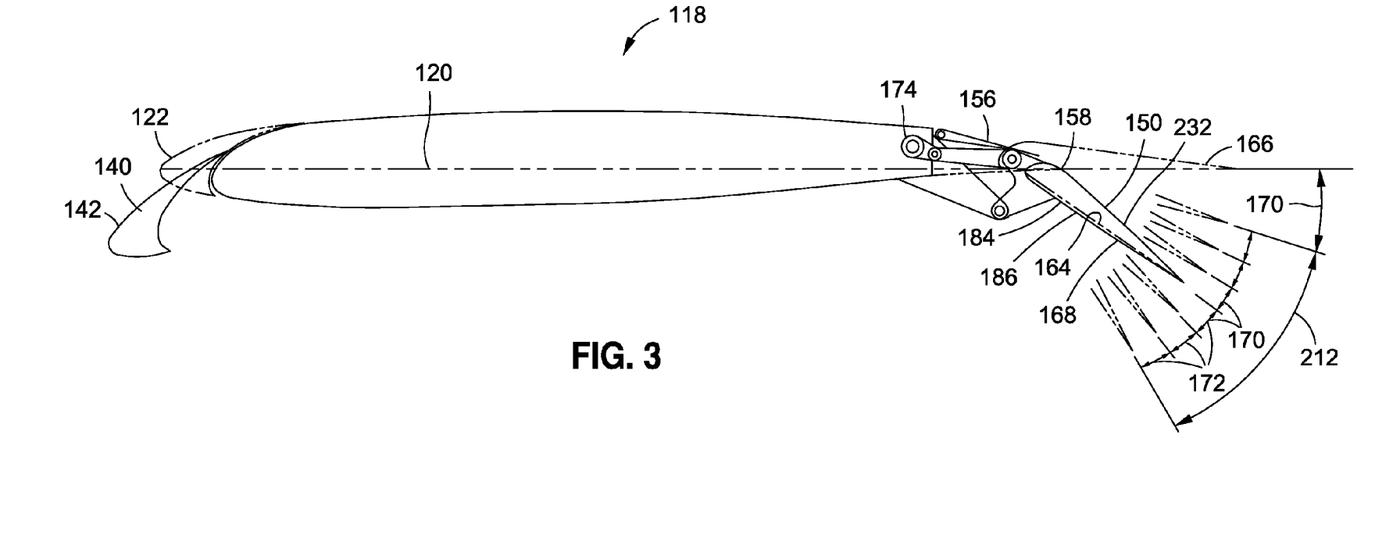
FIG. 3 is a cross-sectional view of the wing of FIG. 2 and showing the leading edge device and the trailing edge device in a deployed position.

Referring to FIG. 2, shown is a cross-section of a wing 118 illustrating an embodiment of a leading edge device 140 in the form of a slat 142 positioned in a neutral or retracted position 146 and illustrating a trailing edge device 150 in the form of a flap 158 in a retracted position 166. The wing 118 may include a spoiler 156 partially overlapping the flap 158. When deployed, the slat 142 may be extended forwardly and downwardly as shown in FIG. 3. In an embodiment, the slat 142 may be coupled to a torque tube (not shown) which may be driven by a power drive unit (not shown) for actuating the slat 142. Although shown as a slat 142, the leading edge device 140 may be provided in any one of a variety of different leading edge device 140 embodiments. For example, the leading edge device 140 may be configured as a Krueger flap, or in other leading edge device embodiments.

In FIG. 2, the trailing edge device 150 is shown as a simple flap 158 supported on a drop hinge 160 and which may be actuated to an optimum flap setting 184 (FIG. 3) using the flap optimizing system 180 (FIG. 4) disclosed herein. In the present disclosure, when the flap 158 is in a retracted position 166 as shown in FIG. 2, the flap chord line 164 may be aligned with the wing chord line 120 which may pass through the trailing edge of the flap 158. However, the flap 158 may be provided in alternative embodiments wherein the flap chord line 164 is not aligned with the wing chord line 120 when the flap 158 is in a retracted position 166. Although the trailing edge device 150 is shown as a simple flap 158, the trailing edge device 150 may be provided in any one of a variety of different configurations, and is not limited to the drop hinge 160 flap 158 embodiment. For example, the trailing edge devices 150 may be configured as plain flaps, single-slotted flaps, multi-slotted Fowler flaps, or any one of a variety of other trailing edge device 150 configurations that may be actuated in conjunction with the flap optimizing system 180 disclosed herein. In this regard, although the flap optimizing system 180 is described in the context of optimizing the position of a flap 158, the flap optimizing system 180 may be configured to optimize the position of other trailing edge devices 150 such as flaperons 154 (FIG. 1), ailerons 152 (FIG. 1), and other trailing edge devices 150, and is not limited to optimizing the position of a flap 158.

Figure 4:
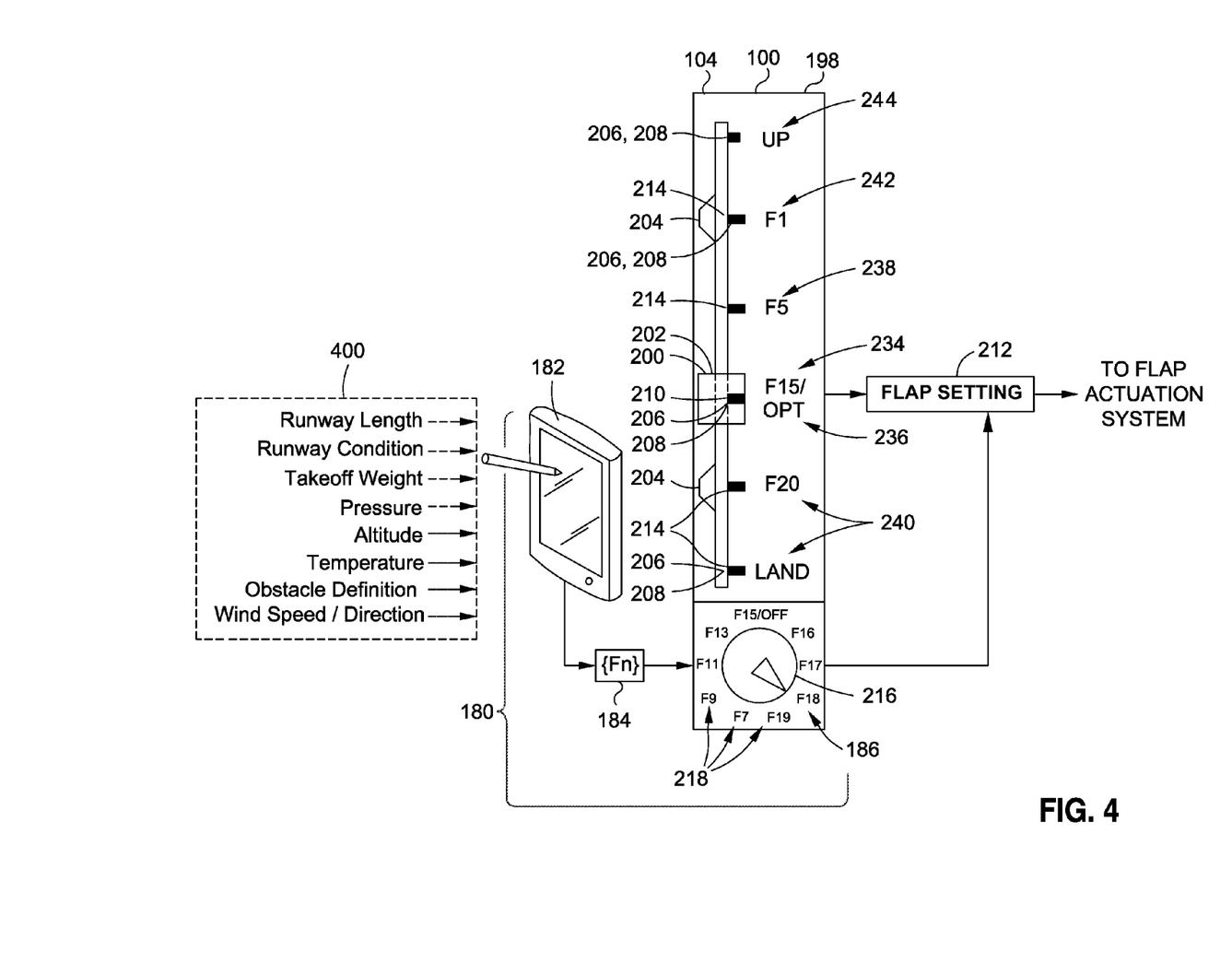
FIG. 4 is a diagrammatic view of a system for determining an optimum flap setting, and further showing a flap control device having a variable-trailing-edge-position switch for selecting a desired flap setting corresponding to the optimum flap setting.

Referring to FIG. 3, shown is a cross-section of a wing 118 illustrating the leading edge slat 142 and the trailing edge flap 158 in a deployed position 148, 168. The flap 158 may be actuated by the flap actuation system 174 in response to selection of a flap setting using a flap optimizing system 180 (FIG. 4) disclosed herein. In an embodiment, the flap actuation system 174 may include a trailing edge linkage assembly (not shown) that may be coupled to a torque tube (not shown). The torque tube may be rotatably driven by a centrally-located power drive unit (not shown) and/or by a local dedicated actuator (not shown). Actuation of the flaps 158 may be performed by actuator control electronics (not shown) which may operate in conjunction with a flight control computer 182 (FIG. 4). As described in greater detail below, in an embodiment, the flaps 158 may be actuated in response to a command issued by the pilot using a variable-trailing-edge-position switch 216 (FIG. 4) of a flap control system 198.

Referring to FIG. 4, shown is a diagrammatic illustration of a flap optimizing system 180 including a processor-based flight control computer 182 as may be implemented for determining the optimum flap setting 184 (FIG. 3). The flight control computer 182 may compute the optimum flap setting 184 and a corresponding optimum thrust setting 220 (FIG. 7) based on aircraft data 400 which may include airport parameters and/or airport atmospheric data. The flap optimizing system 180 may include a flap control device 200 which may provide a means for adjusting the flaps 158 to any one of a variety of different flap deflection angles (i.e., flap settings). The flaps 158 may be positioned to one of a plurality of discrete flap settings within a flap setting range 212 (FIG. 3). The flap optimizing system 180 advantageously includes the variable-trailing-edge-position switch 216 which may allow a pilot to select a desired flap setting 186 which may correspond to the optimum flap setting 184 (FIG. 3) as determined by the flight control computer 182. The optimum flap setting 184 or the desired flap setting 186 may satisfy takeoff performance requirements for the aircraft 100 such as requirements for takeoff distance, minimum unstick speed, tail-clearance, climb gradient, obstacle clearance, and other requirements.

In FIG. 4, the aircraft data 400 may include aircraft gross weight, aircraft center of gravity, maximum takeoff thrust generated by the propulsion units 106 (FIG. 1), and/or other aircraft data 400 reflecting the state of the aircraft 100. Aircraft data 400 may also include airport parameters and airport atmospheric data. Airport parameters may include data that is generally static or non-changing regarding an airport. For example, airport parameters may include the runway length and runway gradient, the location of any obstacles (not shown) relative to the runway, local terrain, and other static parameters associated with the airport. Airport parameters may further include rolling resistance of the runway surface which may affect the acceleration of the aircraft during takeoff. For example, a paved and smooth runway may provide less rolling friction and allow faster acceleration for the aircraft 100 than a gravel runway or grass runway. In addition, airport parameters may include the current runway condition such as whether the runway is dry or damp, or contaminated with standing water, snow, slush, or other debris which may increase rolling friction and/or retard acceleration of the aircraft 100. Airport parameters may further include the airport elevation which may affect the density altitude or pressure altitude which may have a direct bearing on the aerodynamics and engine performance of the aircraft 100.

The aircraft data 400 may include airport atmospheric data representing meteorological conditions at the airport and/or near the airport, such as along the aircraft departure route during the climb-out phase when the aircraft 100 is departing the runway. Such airport atmospheric data may include outside air temperature as may be measured at a control tower of the airport or at other locations at or near the airport. The outside air temperature may affect the above-mentioned density altitude and pressure altitude. Airport atmospheric data may further include the wind direction as may be indicated by a windsock or other wind-measuring device. Airport atmospheric data may also include wind speed, wind gust information, and other atmospheric data. The aircraft data 400 may be pre-loaded into the flight control computer 182 and/or entered into the flight control computer 182 by a pilot or other flight crew member or other personnel.

In FIG. 4, the flight control computer 182 may be located remotely from the aircraft 100. For example, in the process of developing a flight plan, an airline dispatcher may load aircraft data 400 and/or airport information into a remote flight control computer 182 which may determine the optimum flap setting 184 and/or optimum thrust setting 220. Prior to departure, the airline dispatcher may transmit the optimum flap setting 184 and other flight plan data to the flight crew on the flight deck. Alternatively, the flight crew may retrieve the optimum flap setting 184 by contacting the airline dispatcher or other personnel prior to takeoff. The optimum flap setting 184 and/or optimum thrust setting 220 may be transmitted to the flight crew verbally and/or by data transmission such as by internet connection to a local area network of the airport, by other wireless means, and/or by hardwired means.

In a further embodiment, the flight control computer 182 may be located onboard the aircraft 100. For example, the flight control computer 182 may be integrated into the avionics (not shown) or into a flight control system (not shown) on the flight deck. Aircraft data 400 may be entered into the flight control computer 182 by the pilot or other flight crew. In another embodiment the flight control computer 182 may be included in a portable computing device that may be carried onboard the aircraft 100 such as by the flight crew. The aircraft data 400 may be entered into the portable computing device at any time prior to departure to determine the optimum flap setting 184. In an embodiment, the flight control computer 182 may receive updated or real-time airport atmospheric data such as outside air temperature, wind direction, wind speed, runway conditions, and other data prior to departure to compute an updated optimum flap setting 184 and/or optimum thrust setting 220 for takeoff.

In FIG. 4, the flap control device 200 may be included with or integrated into a flight control system (not shown) of the aircraft 100. For example, the flap control device 200 may be mounted on a console or control stand on the flight deck. The flap control device 200 may include a plurality of control device positions 206 corresponding to flap settings. In an embodiment, the flap control device 200 may be configured as a flap control lever 202 or handle that may be movable along a forward-and-aft direction between one or more flap lever positions 208. However, the flap control device 200 may be provided in any embodiment for manipulating the flaps 158, and is not limited to a flap control lever 202. The flap control device 200 may have a plurality of flap lever positions 208 and may optionally include one or more mechanical gates 204 configured to prevent movement of the flap control lever 202 until the flap control lever 202 is lifted, depressed, or otherwise manipulated to move the flap control lever 202 past the mechanical gate 204. For example, the gates 204 at the F1 and F20 detents may prevent inadvertent retraction of the flaps 158 past such flap settings.

Figure 5:
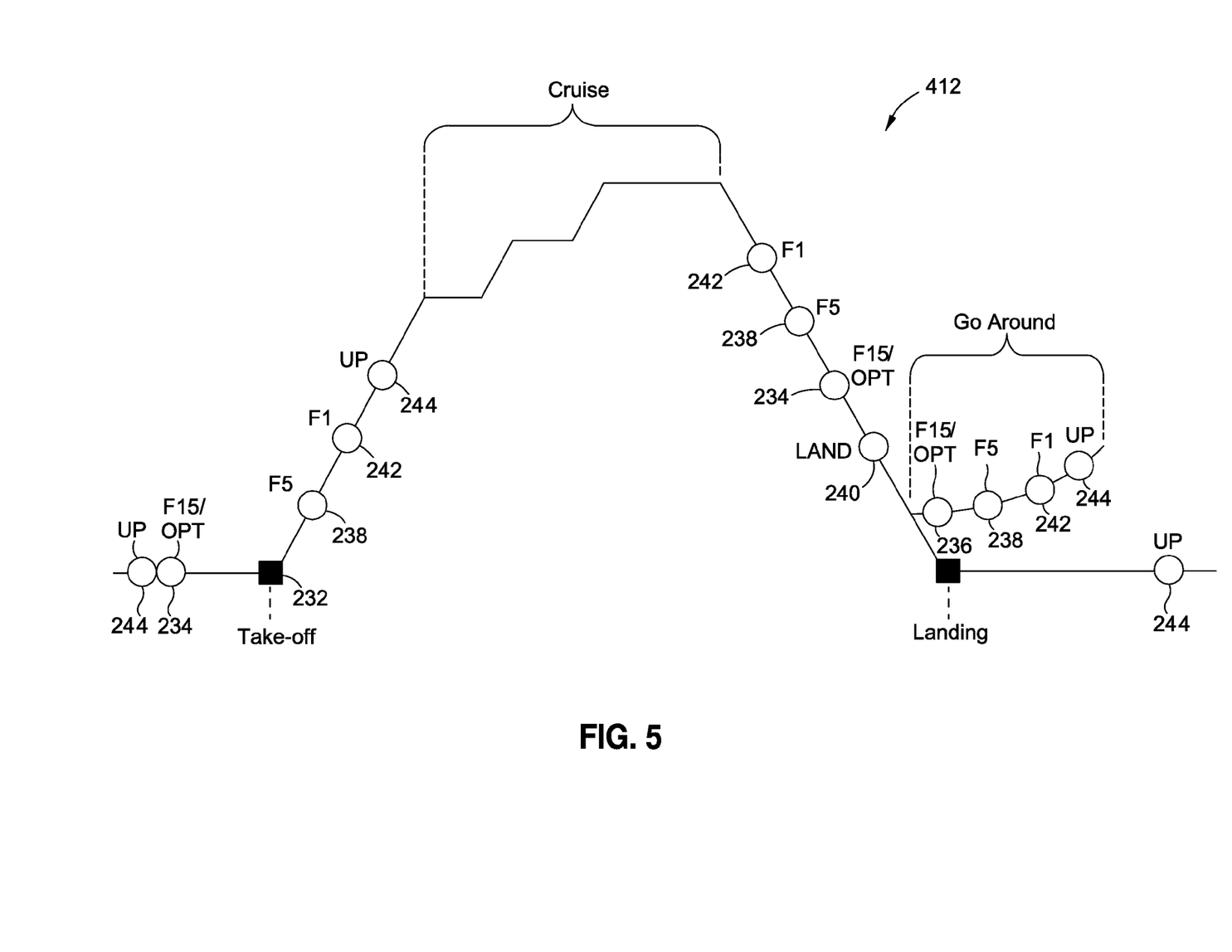
FIG. 5 is an embodiment of a flight profile of an aircraft showing different flap settings corresponding to different flight phases of the aircraft.

Each one of the flap lever positions 208 may correspond to a flap setting or flap setting range 212. For example, one of the flap lever positions 208 may correlate to a flap setting range 212 associated with a takeoff flaps position 234 (F15/OPT) for placing the aircraft 100 in a takeoff configuration 232 (FIGS. 3 and 5). Other flap lever positions 208 may include an up flaps position 244 (UP) corresponding to a cruise configuration (FIG. 5) of the aircraft 100, a hold flaps configuration 242 (F1) corresponding to a hold configuration of the aircraft 100, an approach flaps position 238 (F5) corresponding to an approach configuration of the aircraft 100, a go-around flaps position 236 (F15/OPT) corresponding to a go-around configuration of the aircraft 100, a landing flaps position 240 (LAND) corresponding to a landing configuration of the aircraft 100, and other flap lever positions corresponding to other aircraft configurations (not shown).

In FIG. 4, the flap lever positions 208 may be identified by one or more alphanumeric characters such as single digit whole numbers and/or by alpha characters. As indicated above, the flap lever positions 208 may be identified by flap settings UP, F1, F5, F15/OPT, F20, LAND, and which may or may not correspond to the actual flap angles 170 of the flaps 158. For example, on certain aircraft 100, a flap setting of F5 may correspond to an actual flap angle of 12 degrees, or some other actual flap angle. In another embodiment not shown, the flap lever position 208 on certain aircraft 100 may be identified by single digit whole numbers, such as 0, 1, 2, 3/OPT, FULL, and which may correspond to respective actual flap angles of 0, 17, 22, 23-31, and 32 degrees, or to another set of respective actual flap angles. The flap lever position 208 of 3/OPT may comprise the flap lever position 208 for which the variable-trailing-edge-position switch 216 is operative, and may thereby allow for manual selection, in a predetermined flap deflection increment 172 (FIG. 3), of an actual flap angle 170 (FIG. 3) of between and including approximately 23-31 degrees.

For the flap lever positions 208 identified by UP, F1, F5, F15/OPT, F20, LAND, the flap lever position F15/OPT may be a designated flap lever position 210 for which the variable-trailing-edge-position switch 216 is operative, and thereby allowing for manual (e.g., pilot) selection of a desired flap setting 186. The variable-trailing-edge-position switch 216 may be non-operative when the flap control lever 202 is in a non-designated flap lever position 214. The variable-trailing-edge-position switch 216 may be configured to position the flaps 158 within a flap setting range 212 provided by the designated flap lever position 210. For example, when the flap control lever 202 is placed in the flap lever position F15/OPT, the variable-trailing-edge-position switch 216 may be limited to selecting a flap setting of between approximately 5-20 degrees, or some other flap setting range. The pilot may use the variable-trailing-edge-position switch 216 to select a desired flap setting 186 that may be slightly different than the optimum flap setting 184 computed by the flight control computer 182. For example, upon moving the variable-trailing-edge-position switch 216 to switch position F18, the flap actuation system 174 may be commanded to position the flaps 158 at the flap setting corresponding to the F18 switch position.

Although the variable-trailing-edge-position switch 216 is described in the context of adjusting the flap setting when the flap control lever 202 is in a single designated flap lever position 210 such as a takeoff flaps position 234 (e.g., F15/OPT), the flap control system 198 may be provided in an embodiment wherein the variable-trailing-edge-position switch 216 is operative in more than one designated flap lever position 210. In this regard, the switch may be operative to adjust the flap setting in flap deflection increments 172 (FIG. 3) of a predetermined minimum amount whenever the flap control lever 202 is in any one of a number of different designated flap lever positions 210. For example, the switch may be operative when the flap lever position 208 is in the F15/OPT position (e.g., takeoff flaps position 234), and may also be operative when the flap lever position 208 is in the LAND position (e.g., landing flaps position 240).

In FIG. 4, the variable-trailing-edge-position switch 216 may be located near the flap control lever 202. Although shown as a rotary dial, the variable-trailing-edge-position switch 216 may be configured as a push-button mechanism, as a mechanical slider, or in any one of a variety of other switch embodiments. The variable-trailing-edge-position switch 216 may include a plurality of the switch positions 218. In an embodiment, the variable-trailing-edge-position switch 216 may comprise a detented switch with discrete contacts and/or mechanical stops at each switch position 218. The detents of the variable-trailing-edge-position switch 216 may be configured to prevent inadvertent actuation of the variable-trailing-edge-position switch 216.

In an embodiment, the variable-trailing-edge-position switch 216 may be configured to be non-movable unless commanded by positive action from the flight crew. Furthermore, the variable-trailing-edge-position switch 216 may also be configured to protect against inadvertent actuation. For example, the variable-trailing-edge-position switch 216 may require depressing the variable-trailing-edge-position switch 216, or pulling up on the variable-trailing-edge-position switch 216 before the switch can be moved or rotated. In addition, the variable-trailing-edge-position switch 216 may be configured such that flap extension and flap retraction are commanded by moving the variable-trailing-edge-position switch 216 in mutually exclusive directions.

In a further embodiment, instead of mechanically selecting a desired flap setting 186 using the variable-trailing-edge-position switch 216, the optimum flap setting 184 may be digitally selected in a software program implemented in a flight control system (not shown) of the aircraft. For example, after the flight control computer 182 determines the optimum flap setting 184, the optimum flap setting 184 may be digitally entered into a flight management computer (not shown) or other system for automatically commanding the flap actuation system 174 to move the flaps 158 to the optimum flap setting 184. By "automatic" or "automatically," it is meant in the context of the present application that the action (e.g., command, control, movement, deployment, extension, etc.) occurs or is performed without manual input (e.g., from the flight crew or other operator). In an embodiment, such an arrangement may provide for pilot override of the optimum flap setting 184, or allow the pilot to adjust the optimum flap setting 184 to a desired flap setting 186 that may be slightly different than the optimum flap setting 184 using the variable-trailing-edge-position switch 216.

In an embodiment, the variable-trailing-edge-position switch 216 may be configured to change the desired flap setting 186 such that the flaps are adjusted in flap deflection increments 172 (FIG. 3) of no greater than approximately one degree of actual flap angle 170 (FIG. 3). However, the variable-trailing-edge-position switch 216 may be configured to adjust the flaps 158 in flap deflection increments 172 of greater than one degree of actual flap angle 170. In embodiments wherein the flaps 158 (FIG. 3) are configured as simple flaps 158, the actual flap angle 170 (FIG. 3) may defined as the angle between the local wing chord line 120 (FIG. 3) and the local flap chord line 164 (FIG. 3), as described above, wherein the local flap chord line 164 may be aligned with the local wing chord line 120 when the flap 158 is in a retracted position 166 (FIG. 3). However, for multi-slotted flaps or other non-simple flap configurations, the actual flap angle 170 may be measured by different means. For example, for a multi-slotted flap (not shown) having an intermediate flap element (not shown) and an aft flap element (not shown), the flap angle may be measured between a local flap chord line of the intermediate flap element and the local wing chord line.

In FIG. 4, the difference between two adjacent switch positions 218 on the variable-trailing-edge-position switch 216 may correspond to a flap deflection increment 172 for adjusting the position of the flaps 158 (FIG. 3). For example, moving the variable-trailing-edge-position switch 216 from switch position F17 to switch position F18 may move the flaps 158 by a flap deflection increment 172 of approximately one degree of actual flap angle. However, moving the variable-trailing-edge-position switch 216 between two (2) adjacent switch positions 218 may move the flaps 158 in flap deflection increments 172 of less than or greater than approximately one degree of actual flap angle.

In addition, the variable-trailing-edge-position switch 216 may be configured such that the switch positions 218 allow for moving the flaps 158 at non-uniform flap deflection increments 172. For example, the flap deflection increment 172 may be relatively small (e.g., a one-degree flap deflection increment) when the flap lever position 208 is in a shallow flap setting such as the F5 position (e.g., the approach flaps position 238). The flap deflection increment 172 may be larger (e.g., a two-degree flap deflection increment) when the flap lever position 208 is in a deeper flap setting such as the LAND position (e.g., the landing flaps position 240). Although the variable-trailing-edge-position switch 216 is shown in FIG. 4 having switch positions (e.g., F16, F17, F18, etc.) arranged in a circular pattern around the perimeter of the variable-trailing-edge-position switch 216, the variable-trailing-edge-position switch 216 may instead be provided with a digital display window (not shown) for digitally displaying the optimum flap setting 184 computed by the flight control computer, or digitally displaying the desired flap setting 186 which may be manually selected by the pilot using the variable-trailing-edge-position switch 216. The flap optimizing system may be configured such that when the flap lever position 208 is in a shallow flap setting such as the F5 position, the digital display window (not shown) displays relatively small flap deflection increments (e.g., one degree increments such as 16, 17, 18, etc.) as may be adjusted by the pilot using the variable-trailing-edge-position switch 216, and when the flap lever position 208 is in a deeper flap setting such as the LAND position, the digital display window displays larger flap deflection increments (e.g., two-degree increments) as may be adjusted by the pilot using the variable-trailing-edge-position switch 216.

FIG. 5 shows a flight profile 412 of an aircraft 100 with different flap settings corresponding to different phases of a flight. During any one of the flight phases, the flap control system 198 may be configured such that the variable-trailing-edge-position switch 216 may be used to fine tune the flap setting within the range of flap deflection angles provided by the designated flap lever position 210. In this regard, the variable-trailing-edge-position switch 216 is not limited to adjusting the flap setting prior to takeoff when the flap control lever 202 is in the takeoff flaps position 234 or the go-around flaps position 236 (F15/OPT), but may also be adjusted during one or more flight phases such as during a climb-out phase when the flap control lever 202 is in the approach flaps position 238 (F5), during a cruise phase when the flap control lever 202 is in the up flaps position 244 (UP), during a holding phase when the flap control lever 202 is in the hold flaps position 242 (F1), and during a landing phase when the flap control lever 202 is in the landing flaps position 240 (LAND).

Figure 6:
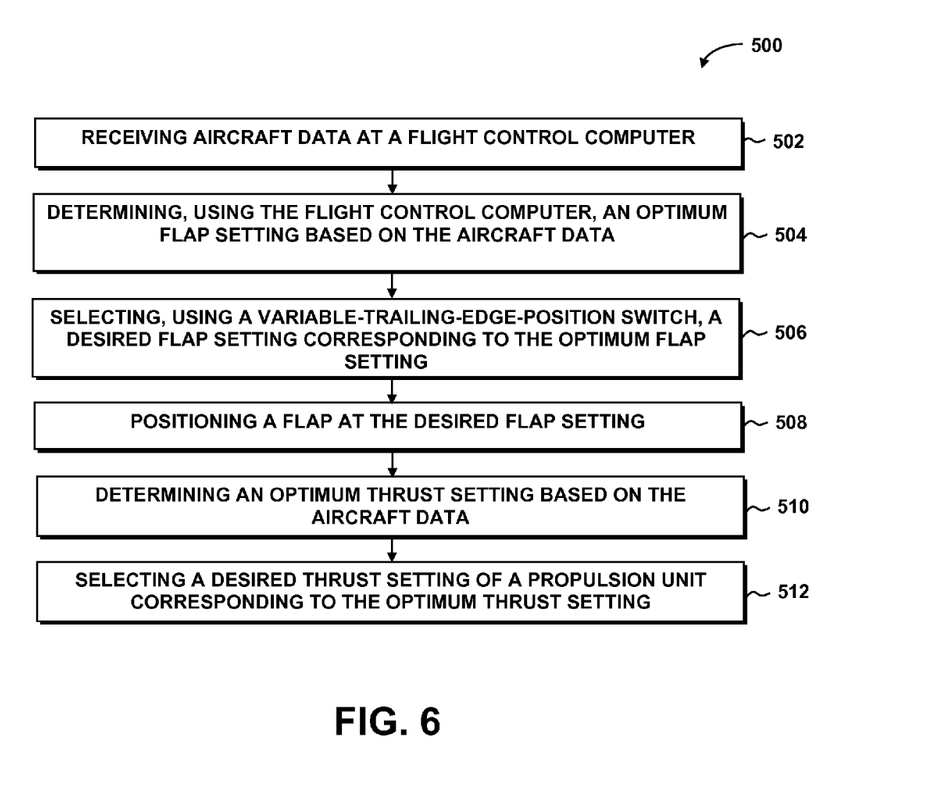
FIG. 6 is a flowchart illustrating one or more operations that may be included in a method of optimizing a flap setting and a thrust setting of an aircraft.
Figure 7:
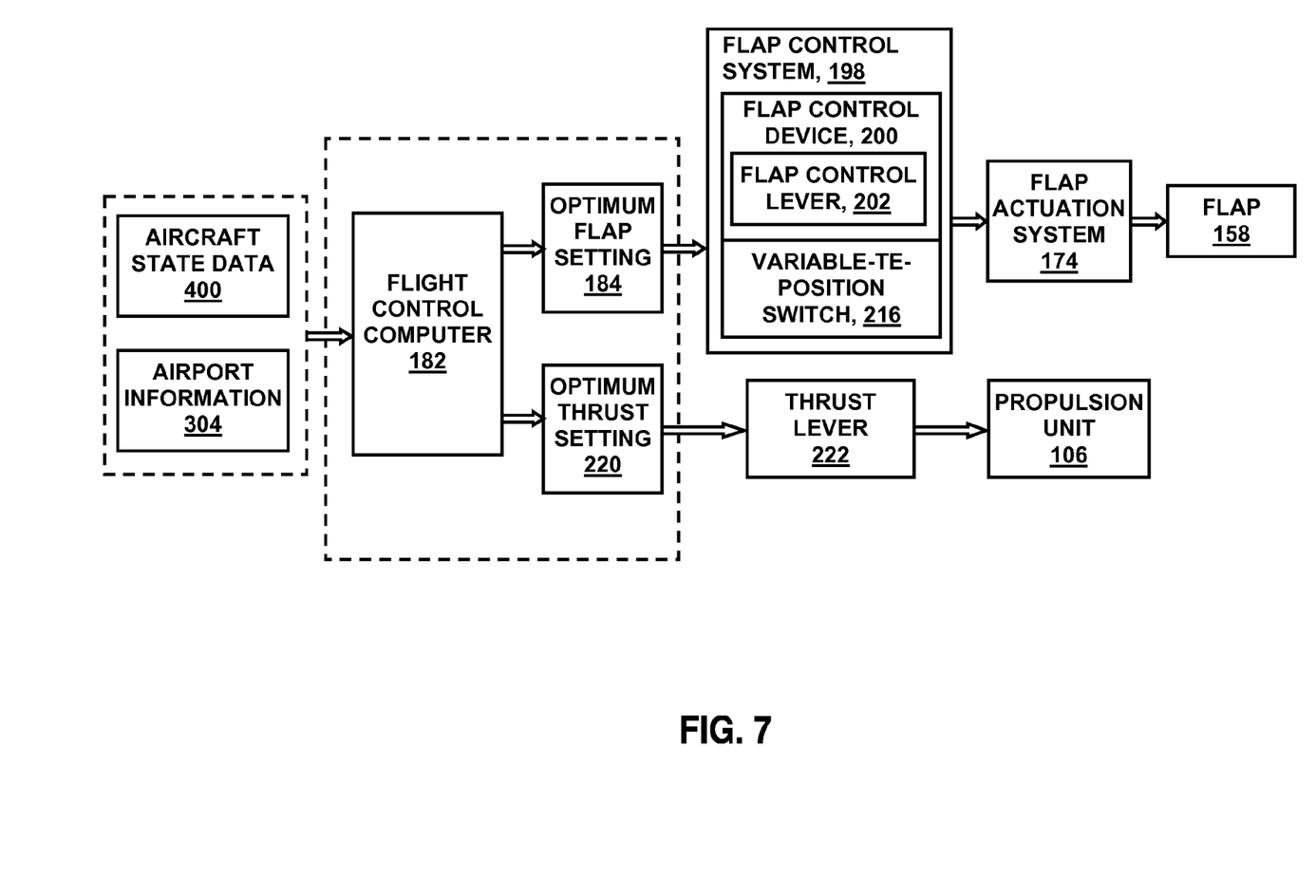
FIG. 7 is a block diagram of an implementation of a flap optimizing system for determining an optimum flap setting and a thrust setting based on aircraft data and/or airport information.

Referring to FIG. 6 with additional reference to the block diagram of FIG. 7, shown is an embodiment of a method of optimizing the performance of an aircraft 100. In an embodiment, the method may include improving the takeoff performance of the aircraft 100 by optimizing a flap setting 184 (FIG. 4) of one or more flaps 158 (FIG. 1) or other trailing edge devices 150 (FIG. 1) for takeoff of the aircraft 100. The performance of the aircraft 100 may also be improved by computing an optimum thrust setting 220 of the propulsion units 106 in correspondence with the optimum flap setting 184. For example, the optimum flap setting 184 may allow for a reduced thrust setting which may improve aircraft performance by reducing fuel burn resulting in a reduction in the amount of fuel required for a given mission. The reduction in fuel required may translate into increased payload capability of the aircraft 100.

Step 502 of the method 500 may include receiving aircraft data 400 (FIG. 4) at the flight control computer 182 (FIG. 4). As indicated above, the aircraft data 400 may be preloaded into the flight control computer 182 and/or manually entered into the flight control computer 182. For example, static information such as airport parameters including airport elevation, runway length, runway gradient, and obstacle location and obstacle height may be preloaded into the flight control computer 182. Variable or changing airport parameters such as outside air temperature, barometric pressure, wind direction and speed, and/or runway conditions (e.g., wet, snow, slush, ice) may manually or automatically entered into the flight control computer 182 such as in real-time. Likewise, aircraft data 400 such as aircraft takeoff weight, aircraft center of gravity, and/or other aircraft data that may affect takeoff performance may be entered into the flight control computer 182 after the aircraft is fueled and loaded with passengers, cargo, and other payload prior to takeoff.

Step 504 of the method 500 of FIG. 6 may include determining (e.g., calculating) the optimum flap setting 184 (FIG. 4) based on the aircraft data 400. For example, the optimum flap setting 184 for takeoff may be determined by the flight control computer 182 based on aircraft data 400 (FIG. 4) such as runway length, aircraft gross weight, outside air temperature, and other data that may be received at the flight control computer 182. As indicated above, the flight control computer 182 may be located remotely from the aircraft 100 such as in an airline dispatch facility. An airline dispatcher may use the remote flight control computer 182 to compute the optimum flap setting 184 and may then transmit the optimum flap setting 184 to the flight crew by verbal transmission and/or by data transmission to the aircraft 100 such as to an onboard flight control system. In an embodiment, the optimum flap setting 184 may be displayed on instrumentation (not shown) that is visible to the flight crew. Alternatively, the flight control computer 182 may comprise a portable computing device (e.g., a laptop computer) that may be carried onboard the aircraft 100 by the flight crew, or the flight control computer 182 may be fixedly installed with or integrated into a flight control system and/or other avionics on the flight deck, allowing the flight crew to compute the optimum flap setting 184 with the flight control computer 182 while onboard the aircraft 100.

Step 506 of the method 500 of FIG. 6 may include selecting a desired flap setting 186 corresponding to the optimum flap setting 184 (FIG. 4). In this regard, the flight crew may manually select a control device position 206 (FIG. 4) on the flap control device 200 (FIG. 4). For example, the flight crew may manually move the flap control lever 202 (FIG. 4) to a designated flap lever position 210 (FIG. 4) at which the variable-trailing-edge-position switch 216 (FIG. 4) is operative. The variable-trailing-edge-position switch 216 may be non-operative or ineffective when the flap control lever 202 is in a non-designated flap lever position 214 (FIG. 4). The flight crew may then select a switch position 218 on the variable-trailing-edge-position switch 216 after moving the flap control lever 202 to the designated flap lever position 210. The switch position 218 selected by the flight crew may represent a desired flap setting 186 desired by the flight crew which may be the same as the optimum flap setting 184 computed by the flight control computer or different than the optimum flap setting 184.

For example, if the flight control computer 182 computes an optimum flap setting of F19 and the flight crew desires to select a slightly different flap setting (e.g., a desired flap setting 186) such as F18 (FIG. 4), the flight crew may select F18 by rotating the variable-trailing-edge-position switch 216. In this regard, the flight crew may adjust the flap setting to any value that is within the flap setting range 212 for a given designated flap lever position 210 as described above. For example, when the flap control lever is in the flap lever position F15/OPT e.g., takeoff flaps position 234), the variable-trailing-edge-position switch 216 may be limited to selecting a flap setting of between approximately 5-20 degrees. The variable-trailing-edge-position switch 216 may allow the flight crew to change the desired flap setting 186 in predetermined flap deflection increments 172 (FIG. 3). For example, the variable-trailing-edge-position switch 216 may allow the flight crew to adjust the flap setting in flap deflection increments 172 of no greater than approximately one degree of actual flap angle 170 (FIG. 3). However, the flap deflection increment 172 may be greater than one degree of actual flap angle 170, or less than one degree of actual flap angle 170.

Step 508 of the method 500 of FIG. 6 may include positioning one or more flaps 158 at the desired flap setting 186 which may be the optimum flap setting 184 or slightly different than the optimum flap setting 184 as indicated above. In this regard, after the flight crew manually moves the flap control lever 202 to a designated flap lever position 210 and adjusts the variable-trailing-edge-position switch 216 to a switch position 218 corresponding to the desired flap setting 186, the flap actuation system 174 may move the flaps 158 to the desired flap setting 186. Alternatively, before manually moving the flap control lever 202 to a designated flap lever position 210, the flight crew may adjust the variable-trailing-edge-position switch 216 to a switch position 218 corresponding to a desired flap setting 186. When the flap control lever 202 is manually moved to the designated flap lever position 210, the flap actuation system 174 moves the flaps 158 to the desired flap setting 186. The flap actuation system 174 may position other trailing edge devices 150 at the desired flap setting 186 or optimum flap setting 184. For example, the flap actuation system 174 may position trailing edge devices 150 such as flaperons 154 and/or ailerons 152 at the desired flap setting 186 or optimum flap setting 184. Such trailing edge devices 150 may be positioned separately or in conjunction with the positioning of the flaps 158.

Step 510 of the method 500 of FIG. 6 may include computing an optimum thrust setting 220 (FIG. 7) using the flight control computer 182 (FIG. 7) based on the aircraft data 400 (FIG. 7). The optimum thrust setting 220 may be computed in correspondence with the computing of the optimum flap setting 184 and may be based on aircraft data including airport parameters such a airport altitude and atmospheric data such as outside air temperature. The flight crew may adjust the thrust output of the propulsion units 106 (FIG. 7) to the optimum thrust setting 220 using the thrust levers 222 (FIG. 7). For example, in preparation for takeoff, after adjusting the flaps 158 to an optimum flap setting 184 using the variable-trailing-edge-position switch 216, the flight crew may use the thrust levers 222 to adjust the thrust output of the propulsion units 106 to an optimum thrust setting 220 computed by the flight control computer 182, or to a desired thrust setting that may be slightly different than the optimum thrust setting 220.

Advantageously, the optimum flap setting 184 may allow for an optimum thrust setting 220 that may correspond to a reduction in operational settings such thrust output (i.e., engine de-rate) for the propulsion units 106 during takeoff of the aircraft 100. The use of engine de-rate may reduce engine wear resulting in an increase in engine life and a reduction in engine maintenance and associated down time for the aircraft 100. A reduced thrust output associated with an optimum thrust setting 220 may also allow for the use of smaller engines and/or may result in reduced mission fuel burn, improved fuel efficiency for the aircraft 100, and a reduction in engine noise as perceived on the ground (i.e., community noise) during takeoff.

In addition, the combination of the optimum thrust setting 220 and optimum flap setting 184 may provide improved aircraft performance such as improved climb performance of the aircraft during takeoff. For example, the flight control computer 182 may compute an optimum flap setting 184 which may be a shallower flap angle than conventional flap settings available with conventional flap systems. A shallower flap angle of the optimum flap setting 184 may generate a reduced amount of aerodynamic drag for the aircraft 100 during takeoff which may result in an improved climb rate for the aircraft. In this regard, the optimum flap setting 184 may result in an improvement in takeoff field length performance allowing for increased takeoff weight capability of the aircraft 100 where runway length is the limiting factor.

Figure 8:
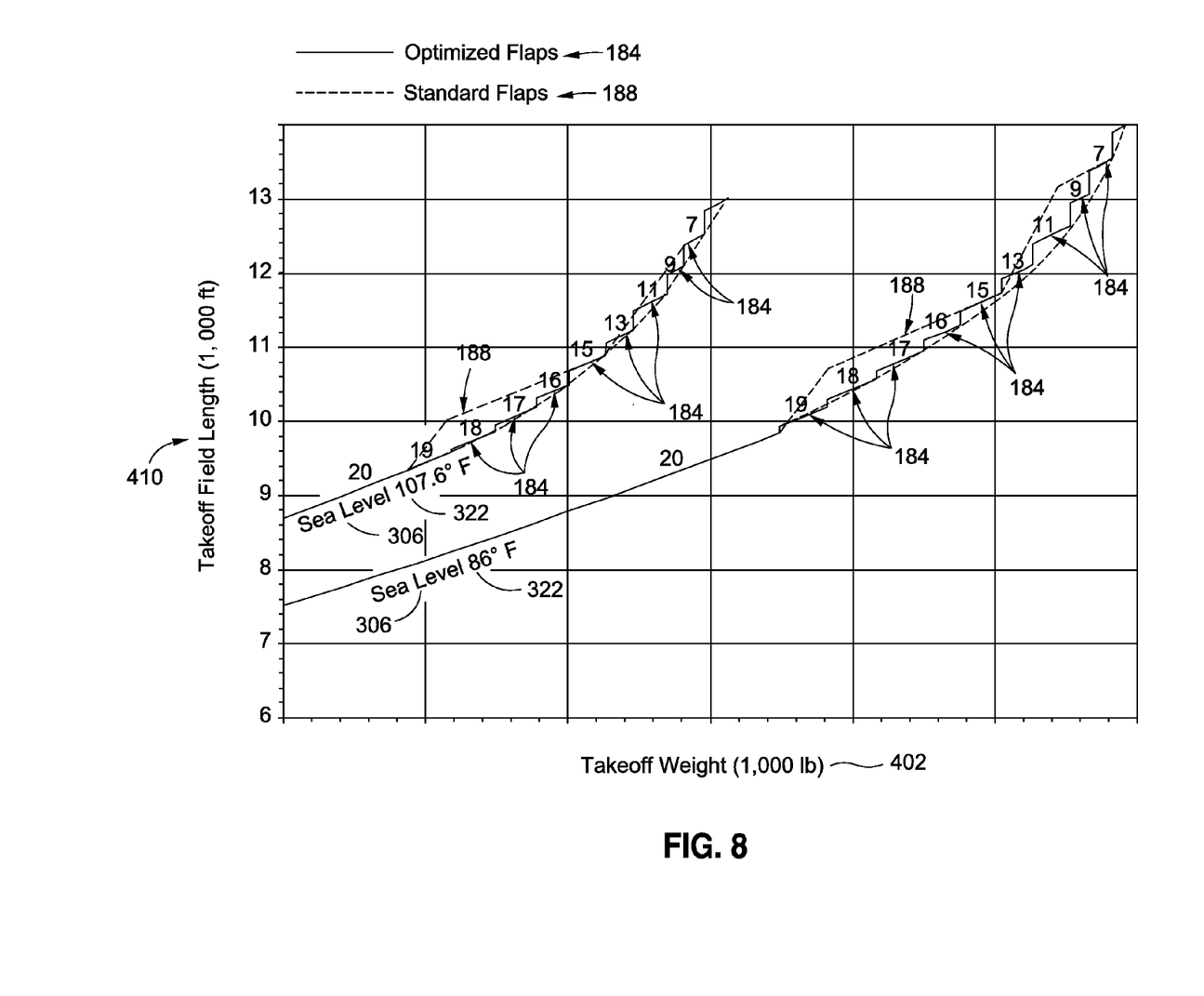
FIG. 8 is a graph plotting takeoff field length versus takeoff weight and illustrating the increase in aircraft performance as a result of optimum flap settings.

Referring to FIG. 8, shown is a graph plotting takeoff field length 410 versus takeoff weight 402 for an aircraft 100 with standard flap settings 188 compared to the same aircraft 100 with optimum flap settings 184. For a sea level airport at an outside air temperature of 107.6 degrees F. and a given takeoff weight 402, a 500-foot reduction in takeoff field length may be realized by using the disclosed flap control system 198 to adjust the flaps 158 to an optimum flap setting of F18 relative to a longer takeoff field length 410 required for a standard flap setting of F15. Conversely, mission payload capability may be maximized by implementing an optimum flap setting 184. For example, for a sea level airport at an outside air temperature of 86 degrees F. for a given takeoff field length, a 9000 pound increase in takeoff weight may be realized by using the disclosed flap control system 198 to adjust the flaps to an optimum flap setting of F18 relative to a reduced takeoff weight available with a standard flap setting of F15.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for optimizing performance of an aircraft, comprising:
   a flight control computer configured to compute an optimum flap setting based on aircraft data;
   a flap control system having a flap control device for selecting one of multiple flap lever positions comprising non-designated flap lever positions and at least one designated flap lever position, the non-designated flap lever positions and the designated flap lever position each corresponding to a standard flap setting, the flap control device having a variable-trailing-edge-position switch being operative when the flap control device is in a designated flap lever position selected from a group consisting of a takeoff flaps position, a go-around flaps position, an approach flaps position, and a landing flaps position, the variable-trailing-edge-position switch allowing for fine tuning of the flap setting of a trailing edge device in real-time during flight within a range of flap deflection angles associated with the designated flap lever position to allow for selection of the optimum flap setting, the optimum flap setting being different than the standard flap setting for the designated flap lever position; and
   a flap actuation system coupled to the flap control system and being configured to position the trailing edge device at the optimum flap setting.

2. The system of claim 1, wherein the flight control computer is configured to determine an optimum thrust setting based on the aircraft data.

3. The system of claim 1, wherein:
   the variable-trailing-edge-position switch being non-operative when the flap control device is in a non-designated flap lever position.

4. The system of claim 1, wherein:
   the variable-trailing-edge-position switch is configured to change the flap setting such that the trailing edge device moves in flap deflection increments of no greater than approximately one degree of actual flap angle.

5. The system of claim 1, wherein the aircraft data includes at least one member of a group consisting of aircraft gross weight, aircraft center of gravity, and maximum takeoff thrust.

6. The system of claim 1, wherein the aircraft data includes at least one member of a group consisting of airport atmospheric data and airport parameters;
   the airport atmospheric data including at least one of outside air temperature, airport elevation, density altitude, pressure altitude, wind speed, and wind direction; and
   the airport parameters including at least one of runway length, runway condition, and obstacle height.

7. An aircraft comprising:
   a wing having a trailing edge device mounted to a trailing edge;
   a system for optimizing a flap setting of the flap, comprising:
   a processor-based flight control computer configured to compute an optimum flap setting based on aircraft data;
   a flap control system having a flap control device for selecting one of multiple flap lever positions comprising non-designated flap lever positions and at least one designated flap lever position, the non-designated flap lever positions and the designated flap lever position each corresponding to a standard flap setting, the flap control device having a variable-trailing-edge-position switch allowing for fine tuning of the flap setting of the trailing edge device in real-time during flight within a range of flap deflection angles associated with the designated flap lever position to allow for selection of the optimum flap setting, the optimum flap setting being different than the standard flap setting for the designated flap lever position, the variable-trailing-edge-position switch being operative when the flap control device is in a designated flap lever position selected from a group consisting of a takeoff flaps position, a go-around flaps position, an approach flaps position, and a landing flaps position; and
   a flap actuation system coupled to the flap control system and being configured to position the trailing edge device at the optimum flap setting.

8. The aircraft of claim 7, wherein the flight control computer is configured to determine an optimum thrust setting based on the aircraft data.

9. A method of optimizing performance of an aircraft, comprising:
   determining an optimum flap setting based on aircraft data;
   selecting, using a flap control device, one of multiple flap lever positions comprising non-designated flap lever positions and at least one designated flap lever position, the non-designated flap lever positions and the designated flap lever position each corresponding to a standard flap setting;
   fine tuning in real-time during flight, using a variable-trailing-edge-position switch, the flap setting of a trailing edge device within a range of flap deflection angles associated with the designated flap lever position to select the optimum flap setting, the optimum flap setting being different than the standard flap setting for the designated flap lever position, the variable-trailing-edge-position switch being operative when the flap control device is in a designated flap lever position selected from a group consisting of a takeoff flaps position, a go-around flaps position, an approach flaps position, and a landing flaps position; and
   positioning the trailing edge device at the optimum flap setting.

10. The method of claim 9, further comprising:
   determining an optimum thrust setting based on the aircraft data.

11. The method of claim 9, wherein the steps of selecting, using the flap control device, one of multiple flap lever positions and fine tuning, using the variable-trailing-edge-position switch, the flap setting comprise:
   moving a flap control lever to a designated flap lever position at which the variable-trailing-edge-position switch is operative; and
   moving the switch position to the optimum flap setting after positioning the flap control lever at the designated flap lever position.

12. The method of claim 9, wherein:
   the variable-trailing-edge-position switch is non-operative when the flap control device is in a non-designated flap lever position.

13. The method of claim 11, further comprising:
   changing, using the variable-trailing-edge-position switch, the flap setting in a manner such that the trailing edge device moves in flap deflection increments of no greater than approximately one degree of actual flap angle.

14. The method of claim 9, wherein the aircraft data includes at least one member of a group consisting of aircraft gross weight, and aircraft center of gravity.

15. The method of claim 9, wherein the aircraft data includes at least one member of a group consisting of outside air temperature, airport elevation, density altitude, pressure altitude, wind speed, wind direction, runway length, runway condition, and obstacle height.

16. The aircraft of claim 7, wherein:
   the variable-trailing-edge-position switch is non-operative when the flap control device is in a non-designated flap lever position.

17. The aircraft of claim 7, wherein:
   the variable-trailing-edge-position switch is configured to change the flap setting such that the trailing edge device moves in flap deflection increments of no greater than approximately one degree of actual flap angle.

18. The aircraft of claim 7, wherein:
   the aircraft data includes at least one member of a group consisting of aircraft gross weight, and aircraft center of gravity.

19. The aircraft of claim 7, wherein:
   the aircraft data includes at least one member of a group consisting of airport atmospheric data and airport parameters;
   the airport atmospheric data including at least one of outside air temperature, airport elevation, density altitude, pressure altitude, wind speed, and wind direction; and
   the airport parameters including at least one of runway length, runway condition, and obstacle height.

20. The aircraft of claim 7, wherein:
   the trailing edge device is one of a plain flap, a single-slotted flap, and a multi-slotted Fowler flap.

* * * * *